United States Patent [19]
Scholle

[11] 3,772,084
[45] Nov. 13, 1973

[54] METHOD OF MAKING NEGATIVE BATTERY PLATES

[75] Inventor: William R. Scholle, Compton, Calif.

[73] Assignee: Scholle Corporation, Northlake, Ill.

[22] Filed: Feb. 11, 1972

[21] Appl. No.: 225,405

[52] U.S. Cl. ................................................. 136/27
[51] Int. Cl. .......................................... H01m 35/18
[58] Field of Search ........ 136/26–27, 33–34, 36, 76, 136/20, 19, 9, 75, 82, 64, 48, 54, 24, 29, 63, 67; 320/2; 204/3, 20–21, 115

[56] References Cited
UNITED STATES PATENTS

| | | | |
|---|---|---|---|
| 2,694,100 | 11/1954 | Zahn | 136/58 |
| 2,887,522 | 5/1959 | MacKenzie | 136/33 |
| 3,084,207 | 4/1963 | Hughes et al. | 136/27 |
| 3,269,863 | 8/1966 | Helms | 136/36 |
| 3,466,193 | 9/1969 | Hughel | 136/26 |
| 3,516,863 | 6/1970 | Willmann et al. | 136/58 |
| 3,556,854 | 1/1971 | Wheadon et al. | 136/26 X |
| 3,579,385 | 5/1971 | Feduska et al. | 136/67 |
| 3,607,412 | 9/1971 | Holloway | 136/67 |
| 3,621,543 | 11/1971 | Willmann et al. | 136/36 |

Primary Examiner—Anthony Skapars
Attorney—Lee J. Gary et al.

[57] ABSTRACT

A negative battery plate is constructed from a light weight, non-conductive grid by providing the grid with an initial minimal degree of conductivity and then pasting the grid with relatively non-conductive metal oxide battery paste. The minimal conductivity of the grid is utilized to initiate the conversion of the metal oxide paste to the elemental metal by electrolysis in a suitable electrolyte. The grid may contain only a single conductive lug in contact with the paste or may additionally contain one or more wires connected to the lug and passing through the interior of the grid. Alternatively, a thin coating of the elemental metal may be deposited on the grid before application of the paste. In accordance with another embodiment, an inert grid filled with oxide paste may be converted to metal by pressing a separable conductive member against the grid and battery paste during electrolysis. The minimal conductivity of the freshly prepared plate is sufficient to initiate the electrolysis, and the reaction rate accelerates as the conversion to metal proceeds, due to the progressively increasing conductivity of the plate.

4 Claims, 6 Drawing Figures

PATENTED NOV 13 1973 3,772,084
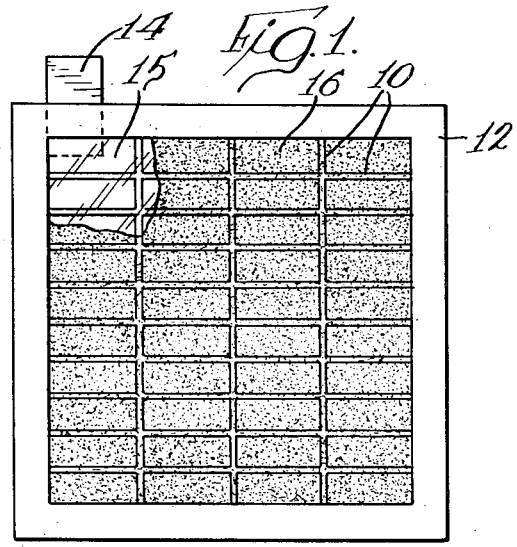
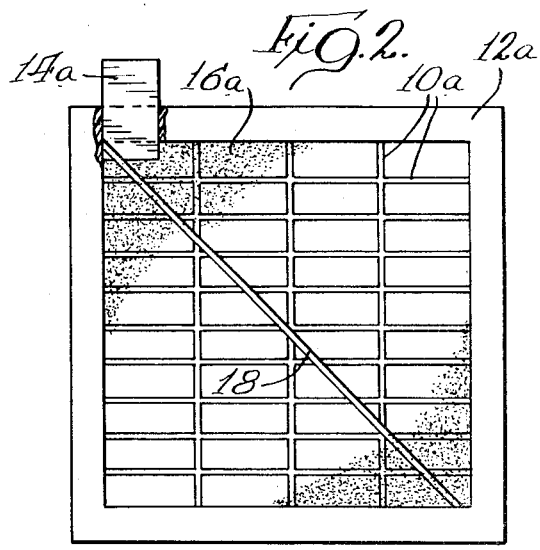
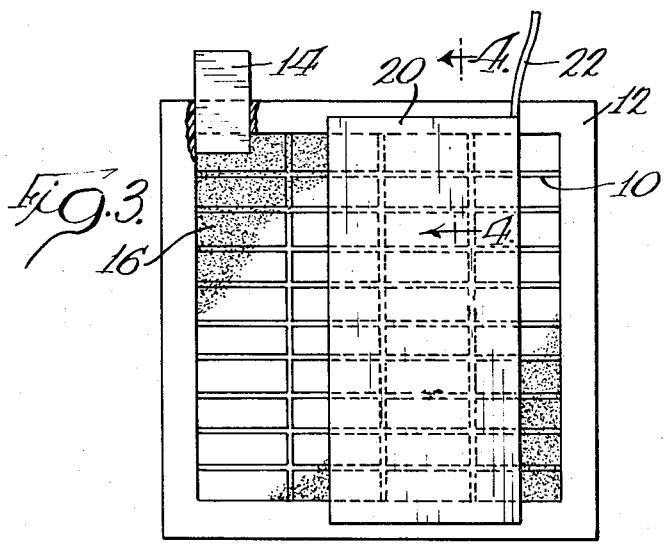
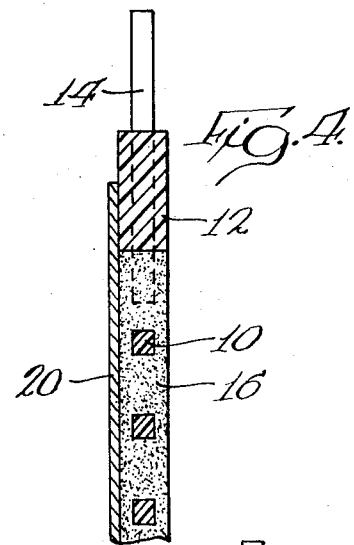
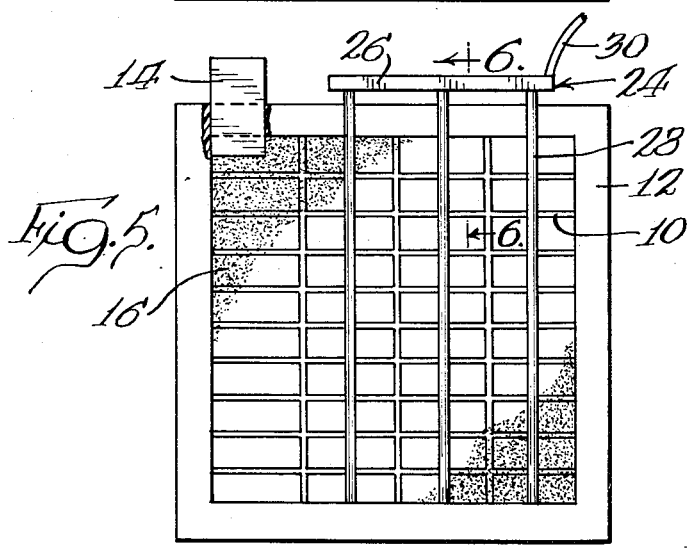
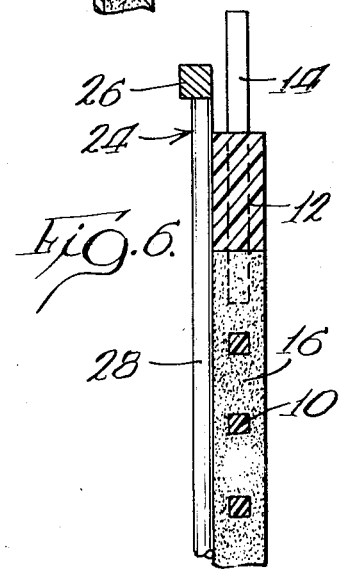

METHOD OF MAKING NEGATIVE BATTERY PLATES

BACKGROUND OF THE INVENTION

This invention relates to battery plates of the accumulator type and more particularly to a negative battery plate and a method for its construction wherein the plate is composed substantially of light weight non-conductive grid having an electrolytic conductive material deposited thereon and filling the spaces of the grid.

Negative battery plates are typically prepared from grids composed of lead, the grid serving as an electrical conductor and providing a mechanical frame in which lead oxide paste is held. The lead in the frame is normally alloyed with a small proportion of a second metal, such as antimony, in order to stiffen the grid and allow it to be subjected to normal processing.

After the lead grids have been pasted with lead oxide paste, opposed plates are disposed in a sulfuric acid bath and subjected to a charging cycle, whereby positive and negative plates are formed. In the case of the negative plates, the lead oxide paste is converted to sponge lead, and the plates are then ready for incorporation into a battery.

Since elemental lead or other metals employed in battery grids are heavy and relatively costly components, it would be desirable to employ acceptable substitutes which would be capable of lowering the weight and expense of the battery. In addition, elimination of the alloying in the grid would be desirable, since agents such as antimony and the like cause self-discharge of the battery before it is placed into service. The benefits of weight savings in batteries are many and include lower freight in transporting a new battery to its place of sale, as well as the use of stored electrical energy to propel a vehicle.

SUMMARY OF THE INVENTION

The heavy metallic grid of a conventional battery plate is eliminated in a negative battery plate by substituting a grid composed of a light weight, non-conductive material that has an initial minimal degree of conductivity imparted thereto. The grid is then pasted with the desired metal oxide that is converted to the elemental metal by electrolysis. The conversion of the oxide to metal by electrolysis may be initiated by a single conductive lug in contact with the battery paste at one corner of the grid. In addition, a wire may be connected to the lug and disposed within the spaces of the grid to enhance or increase the initial rate of the conversion. As an alternative, the plastic grid may be provided with a thin coating of metal by electrodeposition, or a separate conducting element may be pressed into contact with the battery paste during charging and then removed when charging has been completed. Although the conductivity of the plate is initially fairly low, the electrolytic metal initially formed progressively increases the conductivity of the plate and sustains and accelerates the oxide to metal conversion.

BRIEF DESCRIPTION OF THE DRAWINGS

FIG. 1 is an elevational view of the battery plate of the present invention, which additionally illustrates the progressive conversion of the oxide paste;

FIG. 2 is an elevational view of another battery plate of the present invention which has been modified by the addition of a conductive wire running through the grid;

FIG. 3 is an elevational view of another embodiment of the present invention wherein a separate conductive member is employed to facilitate the conversion of the oxide paste during the charging cycle;

FIG. 4 is a side view of the embodiment in FIG. 3;

FIG. 5 is an elevational view similar to FIG. 3 but showing another form of a separate conductive member; and FIG. 6 is a side view of the battery plate and conductive member shown in FIG. 5.

DESCRIPTION OF THE PREFERRED EMBODIMENTS

With reference to FIG. 1, the negative battery plate shown comprises a rectangular grid 10 secured to and surrounded by a frame 12, said grid and frame being composed of a light weight, non-conductive material, such as a rigid plastic material that is resistant to acid. The grid 10 has a plurality of rectangular or other shaped openings therein and is formed by any convenient method, such as by injecting molding, extrusion, stamping, vacuum forming, or the like. A conductive terminal lug 14 may be provided at one corner of the grid with one end projecting out of the grid and the other end being embedded in the interior of the grid.

Metal oxide battery paste 16 is applied to the grid 10 in such a manner that the paste engages the terminal 14 and fills the voids or openings in the grid and forms a continuous layer or face over the surface of the grid. When subjected to the charging cycle, the pasting in contact with the terminal 14 is first converted to a conductive metal, which in turn serves as a conductor for progressively converting the remainder of the paste on the grid into electrolytic metal. The charging cycle may comprise any charging process known in the art, such for example as placing the negative plate in a sulfuric acid bath in proximity to a positive plate, and applying current across the plates to effect the conversion.

In accordance with the preferred embodiment of the invention, the battery paste is composed primarily of lead oxide and may contain other ingredients well known in the art, such as relatively inert binders, to enable the desired consistency and adhesiveness to be obtained. During the electrical charging process, the relatively non-conductive lead oxide is progressively converted into conductive sponge lead, and the resulting product or negative plate consists essentially of a light weight, inert grid that contains and is covered with electrolytic lead. Assuming that the required initial conductivity is imparted to the grid, other well known types of negative plates may be prepared, such as zinc and cadmium from their respective and relatively non-conductive oxides.

If the battery plate is to be composed of lead, the terminal 14 is also preferably composed of lead or a metal in the electromotive series that is higher than lead. The terminal need not be formed from cast or solid lead and may take any form, as long as a degree of initial conductivity is imparted to the paste and the conductive member is available for connection to a source of current. The terminal need not, however, be a part of the electrical system of the battery.

After the charging process has been completed, the negative plate is ready for immediate use and may be incorporated directly into a battery, which normally consists of an alternating series of positive and negative plates with separaters therebetween. The separaters may be formed of any of a variety of well known materials, such as fluted wood, perforated rubber, glass fiber compositions or the like. The positive plates are connected in parallel to one post, and the negative plates are connected in parallel to a second post, and the battery is filled with dilute sulfuric acid or other electrolyte to create a potential difference between the positive and negative plates.

From the foregoing, it may be seen that a negative battery plate may be manufactured from starting materials, which except for the terminal element, are completely devoid of elemental lead and alloying elements. All of the lead in the plate is provided by the progressive conversion of the lead oxide battery paste that is held in the inert or non-conductive grid.

An important feature of the present invention is the provision of an initial limited conductor means to the battery paste. Heretofore, the feasibility of a light weight plate has been limited because of the inability to provide a thick enough coating of an elemental material directly to a grid composed entirely of an inert material, especially a thermoplastic material. The principle of limited initial conductivity provides the starting point by which a lead or other metal plate containing an inert grid may be produced in a simple and economic manner.

Another important feature of the present invention is the progressive conversion of the metal oxide to metal from one or more limited locations. The conversion process provides an increasing area of conduction to be imparted to the partially formed plate, which in turn allows for a self-sustaining and progressively increasing conversion rate. This principle is clearly shown in FIG. 1, in which a portion of the conversion has been completed around the terminal 14, thereby providing an area of electrolytic metal 15 having a progressively increasing surface area as well as an increasing area of contact with the oxide paste.

Various expedients may be provided to accelerate the conversion of the lead oxide during the charging process, particularly by providing an initial minimal degree of current conduction through the battery paste. For example, the non-conductive plastic grid shown in FIG. 1 may be provided with a degree of conductivity by first applying a thin coating of a conductive material such as lead to the surface of the grid prior to the application of the paste. The lead coating may be applied by any convenient means, such as by liquid coating, plating, electrodeposition or vacuum deposition. The thin lead coating, although having limited conductivity, serves to initiate the reaction during the conversion process.

Another embodiment of the invention is shown in FIG. 2, which illustrates the battery plate shown in FIG. 1, but with one addition. The battery plate comprises a plastic grid 10a having a plastic frame 12a with a lead terminal 14a at one corner, and the grid 10a is filled with battery paste 16a as previously described. In addition, a wire or elongated member 18, preferably composed of lead, extends from the interior end of the battery terminal and across the face of at least a portion of the grid, preferably diagonally between opposite corners of the grid, although the wire may take any convenient shape and may extend in other directions. The lead wire 18 serves primarily to initiate and promote the conversion of the lead oxide within the plastic grid.

FIGS. 3 and 4 illustrate another embodiment for initiating and carrying out the conversion at a maximum rate. The battery plate shown in FIGS. 3 and 4 is identical to that shown in FIG. 1 and will not be described again in detail. In addition, a removable conductive sheet 20, preferably formed of lead, is placed in contact with the paste on the grid such that the sheet overlays a major portion of the grid. The formation charge may then be applied to a lead 22 connected to the metal sheet alone, or to the lug and the sheet together, in order to quickly convert the lead oxide paste to sponge lead. After the plate has been charged, the conductive plate is removed and may be reused.

A similar arrangement is shown in FIGS. 5 and 6. Again, the battery plate is identical to that shown in FIG. 1, but the separable conductive member 24 is in the form of a conductive comb comprising a base 26 with a plurality of uniformly spaced legs 28 depending therefrom. The comb is placed in contact with the battery paste on one face of the plate in such manner that the legs overlay a majority of the voids in the grid. The base 26 is connected to a lead 30 to which the formation charge is applied. This embodiment in many cases is preferable over that of the solid metal sheet because the comb structure may be easier to remove after the conversion process has been completed.

Having thus described the invention, what is claimed is:

1. Method of making negative battery plates comprising the steps of providing a limited portion of a light weight non-conductive grid with a degree of conductivity, with the bulk of the exposed grid being non-conductive, pasting the conductive portion and the non-conductive portion of the grid with a continuous covering of metal oxide battery paste, and progressively converting said battery paste to metal by electrolysis initially through the conductive portion and at a progressively increasing rate over the non-conductive portion by utilization of the converted metal from the metal oxide paste as a conductor.

2. Method of claim 1 wherein the grid is provided with a minimal degree of conductivity by securing to the grid essentially only a terminal having limited contact with the battery paste, with the remainder of said grid being essentially devoid of conductivity.

3. The method of claim 1 wherein the grid is provided with a minimal degree of conductivity by securing to the grid essentially only a terminal having limited contact with the battery paste and a second narrow conductor extending from said terminal through the grid and in contact with the paste.

4. Method of making negative battery plates comprising the steps of pasting a light weight non-conductive grid with battery paste, bringing a separate conductive member into contact with the paste on the grid, and then progressively converting the battery paste to elemental metal by electrolysis of said paste by applying a formation charge to said conductor, and then removing said conductor.

* * * * *